3,083,105
TREATMENT OF PEPPERMINT OIL
Paul H. Todd, Kalamazoo Township, Kalamazoo County, Mich., assignor to Farmers' Chemical Company, Kalamazoo, Mich., a corporation of Michigan
No Drawing. Filed July 18, 1960, Ser. No. 43,324
16 Claims. (Cl. 99—140)

This invention relates to a method for treating peppermint oil and fractions thereof, particularly to a method for improving the quality thereof, and to products produced by the treatment.

The preparation of peppermint oil is carried out by harvesting the parts of the peppermint plants (*Mentha piperita*) which grow above the ground and recovering the oil from the harvested "hay" by distillation with steam. Upon condensing the vapors from the distillation, the peppermint oil separates from the water as an oily layer which is subsequently recovered and treated in various ways. A variety of qualities of peppermint oil are produced, some of which differ to an appreciable extent from one another insofar as their chemical compositions are concerned. This results from differences in climate and soil.

A principal compound present in peppermint oil is, of course, menthol which is partially in the form of free menthol and partially in the form of menthol esters of various acids. Menthone is also a characteristic and valuable component of peppermint oil. Natural oils (i.e. non-rectified) also contain certain amounts of unsaturated hydrocarbons, usually of the terpene series, as well as minor amounts of other compounds. Not only is the complexity of peppermint oil due to the presence in it of so many different types of compounds and to the fact that most of these may be present in different oils in different proportions, but the situation is aggravated further by the number of optical isomers of many of the individual compounds which may either be present in the oil or which may be formed by racemization and the like of the isomers already present if care is not exercised in treating the oil. As a result of these and other considerations, it has been found extremely difficult to devise any procedure, other than distillation under reduced pressure and other simple measures, for treating peppermint oil to improve its quality in certain ways, which does not, at the same time, detract appreciably from its quality in other ways. Since the characteristic flavoring effect of peppermint oil is apparently due to the combined effect of the several types of compounds in the oil, and since the uses of peppermint oil as a flavoring material have become relatively standardized on the basis of the effect of such a mixture, it is clear that any method of treating the oil which would disturb too greatly the balance between the several kinds of compounds in the oil is very likely to result in a product which does not give the same results as a flavoring material as would the untreated peppermint oil when used under conditions which have become established in the trade.

There are, however, features of certain peppermint oils, especially when derived from certain sources, which are undesirable and which, unless corrected, detract greatly from the quality and value of the oil. This is well exemplified in the case of peppermint oil derived from *Mentha piperita* which is grown in the northwestern part of the United States. Whereas formerly most of the highest grade oil was derived from *Mentha piperita* grown in the Midwest, the bulk of the United States production has now shifted to the northwestern states, especially to the state of Washington, because of the prevalence in the Midwest of certain diseases of this variety of mint plant for which no satisfactory control treatment has yet been devised. However, due to the different climatic conditions prevailing in the Northwest and in the Midwest and to the different agricultural practices of the two regions, the oils produced in the Northwest contain appreciable amounts of menthofuran whereas the oils produced in the Midwest contain little or practically none of this particular compound. This difference appears to be due to the fact that it is most economical to harvest the mint plants under the conditions prevailing in the Northwest at about the time they are in full blossom. It appears that the menthofuran is present in the plant to its greatest extent during the period of blossoming and that the principal seat of its production is the blossoms themselves. At any rate, menthofuran is volatile with steam and it is found that the oils produced in the Northwest may contain as much as from 8 to 12 percent by weight, and sometimes even more, of menthofuran.

Although the menthofuran itself as present in its pure state in freshly prepared or freshly distilled oil is not too objectionable insofar as its effect on the quality of the oil containing it is concerned, it does pose the disadvantage that it absorbs oxygen when exposed to the air with the formation of compounds which may possibly include peroxides, and that these compounds then decompose or react with other constituents of the oil giving rise to products which discolor the oil and impart a bitter taste or "after-flavor" to it. For these and other reasons the presence of more than a very few percent of menthofuran in peppermint oil is highly objectionable. Although it is possible to remove most of the menthofuran by careful fractional distillation of the oil, this, of course, results in a correspondingly low yield of usable product since, to date, no profitable use has been found for the menthofuran fraction. It is difficult to remove the menthofuran as a pure fraction free of other valuable components in the oil, especially of menthone, by fractional distillation and this, of course, increases the loss of valuable material resulting from the procedure. In extreme cases the removal of the menthofuran by fractional distillation may result in a decrease by as much as 20 to 25 percent of the amount of usable product.

It is clear that any method or process which could be employed economically for the treatment of peppermint oil containing menthofuran which would modify the oil so as to overcome the undesired characteristics of the oil imparted to it by menthofuran, and which would not, at the same time, either impart other undesirable characteristics to the oil as a result of the treatment or lead to the loss of an unduly large proportion of the oil, would provide a new product differing chemically from the untreated oil in these important respects and having a correspondingly greater value than the untreated oil. Although the desirability of obtaining these results has long been apparent, no suitable way of effecting them has been described prior to the present invention.

It has now been found, and is herein first disclosed, that, using a platinum, palladium or other platinum group metal hydrogenation catalyst, and employing certain well defined procedures which will be described, it is possible to hydrogenate menthofuran catalytically when mixed with menthone, as in menthofuran-containing peppermint oil, or a fraction of such an oil in which the menthofuran has been concentrated, e.g. by fractional distillation, to convert the menthofuran selectively to a hydrogenation product while leaving the menthone unchanged. It has been found, further, that, when the menthofuran contained in peppermint oil is converted to a hydrogenation product in the way which will be described and the hydrogenation product left in the oil, not only is any substantial loss of material avoided but the flavoring characteristics of the new mixture thus obtained are fully as desirable as those of menthofuran-free peppermint oil. In addition, it has been found that this new product, which has essentially the same composition as the unhydrogenated menthofuran-containing peppermint oil, except for the replacement of the menthofuran and, in some instances, of any unsaturated hydrocarbons, in the oil by hydrogenation products thereof, is not subject to oxidation and the development of color and a bitter afterflavor upon exposure to the air which, as mentioned previously, are characteristic of peppermint oils which contain menthofuran. The selective hydrogenation of the menthofuran contained in peppermint oil thus furnishes a convenient and economical way in which to improve the quality of menthofuran-containing peppermint oil without loss in flavoring characteristics and without the necessity of separating and discarding a portion of the oil to eliminate the menthofuran. Because the new product is entirely free from any tendency to absorb oxygen and to develop a bitter flavor, it is of considerably more value than the menthofuran-containing oil itself. The ease with which the selective hydrogenation of menthofuran can be carried out in admixture with menthone, following the particular procedure of the invention, is surprising in view of the well-known fact that most aldehydes and ketones can be reduced easily to the corresponding primary and secondary alcohols by catalyst hydrogenation in the presence of platinum catalysts.

Although, as just indicated, one modification of the process contemplates the hydrogenation of menthofuran contained in peppermint oil by subjecting the oil itself to the hydrogenation step, it is sometimes desirable, and often more economical, to first distill the oil fractionally and collect as much of the menthofuran as conveniently possible as a menthofuran-rich fraction comprising a considerable proportion of menthone and to then subject this collected fraction to the hydrogenation procedure. This modification is often of special value in the case of peppermint oil having a relatively low proportion, e.g. from 2 to 4 percent, of menthofuran since it enables the hydrogenation step to be carired out on a product having a much higher proportion of menthofuran than does the oil itself. Even in the case of peppermint oil low in menthofuran content, it is not difficult to fractionally distill it and collect practically all of the menthofuran in the form of a fraction of the distillate which may contain as much as 50 percent, or even more, a menthofuran, the balance being mainly menthone which has a boiling point very close to that of menthofuran. Such a fraction can be hydrogenated in a much smaller and less costly apparatus and, in general, with the use and attendant loss of a much smaller proportion of catalyst than when no preliminary segregation of the menthofuran into a menthofuran-rich fraction of the oil is attempted.

Using a modification of the new process involving a preliminary fractional distillation of the oil, it is also possible and convenient to collect most of the unsaturated hydrocarbons present in the natural oil as a fraction separate from the menthofuran-rich fraction and thus to hydrogenate the menthofuran while avoiding hydrogenation of the unsaturated hydrocarbons or to obtain the unsaturated hydrocarbons in a form most economical for discarding should either of these procedures be desirable in any particular instance. It should be pointed out, however, that in carrying out the process according to this modification it is neither necessary nor desirable to carry out the fractionation so as to separate the menthofuran entirely from the menthone. As a matter of fact, if this is attempted it detracts considerably from the attractiveness of the process because of the elaborate equipment, added cost and difficulty of the careful fractionation required. Following the hydrogenation of the menthofuran-rich fraction the hydrogenated fraction can be blended with the unhydrogenated fractions from the fractional distillation, as will be referred to more particularly later on.

It will thus be clear that the present invention is based largely upon the discovery that the hydrogenation of menthofuran can be carried out in admixture with menthone without appreciable effect upon the menthone. It is clear, further, that, although the new product thus formed differs significantly in chemical composition from the product hydrogenated, especially because of the conversion of the menthofuran, and sometimes of the unsaturated hydrocarbons, to hydrogenation products thereof, it is of greater value and utility than the unhydrogenated product.

The term "peppermint oil product" as used herein is, for want of a better term, applied to the material which is subjected to the hydrogenation step according to the foregoing process and which is characterized by comprising both menthofuran and menthone. It will be noted that this term encompasses natural or distilled peppermint oil which contains both menthofuran and menthone as well as a menthofuran-rich fraction of peppermint oil which also contains menthone. The term "peppermint oil product" does not include pure menthofuran even though it can be separated in pure form from certain natural peppermint oils following certain well-known procedures. The term "menthofuran-rich" as used herein in referring to a menthofuran- and menthone-containing fraction of a menthofuran-containing peppermint oil means any fraction of the oil obtained by any method whatever, e.g. by fractional distillation, by fractional crystallization to remove a part of the menthol or by any other convenient method, in which the proportion of menthofuran in the fraction is greater than in the oil from which the fraction is prepared.

The catalyst employed in carrying out the hydrogenation of menthofuran according to the process of the invention is a finely divided catalytic metal selected from the class of metals consisting of ruthenium, rhodium, palladium, osmium, iridium and platinum, generally referred to in the art as the "platinum group" of metals. Of these metals, palladium, platinum and ruthenium are preferred in the order given. It will be observed that, of these three preferred metals, ruthenium and palladium, along with rhodium, are generally referred to as the "light" platinum metals whereas platinum, along with osmium and iridium, are generally referred to as the "heavy" platinum metals. It is thus apparent that both the light and heavy platinum metals are effective catalysts for carrying out the hydrogenation of menthofuran according to the process of the invention.

The platinum group metals can be prepared in catalytic form using any one of a number of conventional procedures. Platinum, for example, can be prepared as the so-called "platinum black" by precipitation from an aqueous solution of platinum tetrachloride by a reducing agent or as the so-called "spongy platinum" by the calcination of ammonium chloroplatinate. In a preferred form the catalyst is prepared on an inert support, e.g. on asbestos or charcoal, such procedures also being conventional in the art. When prepared in this manner, catalytic platinum preparations are often referred to as "platinized asbestos" or "platinized charcoal" or, sometimes, generally, as a "supported platinum" catalyst. Similar terminologies prevail in the case of catalytic forms of the other platinum group metals. In general, in the interest of economy and convenience, a supported catalyst, such as ruthenium, platinum or palladium on asbestos or charcoal, is preferred for use in the process of the present invention, although the invention is not limited to the use of a supported catalyst.

It is, of course, well known that in some instances the platinum group metal is, prior to the actual reduction step, in the form of a compound of the metal, which may or may not be supported, which is easily reduced to the metal by hydrogen under the hydrogenation conditions employed. By way of convenience, the preparation comprising the platinum group metal employed in the herein described procedure is referred to as a "catalyst material" without regard to the precise way in which it is prepared or to whether or not the platinum group metal is in the form of the free metal or of an easily reducible compound thereof.

According to the modification of the process of the invention wherein the hydrogenation of the menthofuran contained in peppermint oil is effected without first segregating it in a fraction of the oil, the oil is mixed with the catalyst material and shaken in an atmosphere of gaseous hydrogen until the absorption of hydrogen ceases. The mixture can then be filtered to remove the solid catalyst, and any insoluble catalyst support which may have been employed, whereupon it is found that the filtrate can be used for flavoring purposes without further treatment and that it has the desirable characteristics mentioned previously which render it superior to the unhydrogenated peppermint oil from which it was prepared.

Since the actual weight of hydrogen absorbed during the hydrogenation process is low compared to the weight of the oil being hydrogenated, its effect on the proportion of menthone, menthol and menthol esters in the product is negligible even when expressed on a weight basis. Thus, if is be assumed that the hydrogenation product of the menthofuran is, as seems likely, tetrahydromenthofuran, and if it be assumed for purposes of calculation that the unhydrogenated peppermint oil contains 10 percent by weight of menthofuran, simple calculation shows that the hydrogenated oil will weigh only about one-third of one percent more than the unhydrogenated oil as a result of the hydrogenation of the menthofuran to form tetrahydromenthofuran. Since the only other observed effect of the hydrogenation when carried out using natural or simply distilled peppermint oil is, in some instances, to hydrogenate minor proportions of unsaturated hydrocarbons present in the oil, which also causes an essentially negligible increase in weight of the oil, it is readily seen that the proportions of menthone, menthol and menthol esters remain essentially the same in the hydrogenated product as in the unhydrogenated oil. This can also be expressed in a slightly more accurate way by referring to molar concentrations since, insofar as has been observed, the molar concentrations of menthone, as well as of menthol and menthol esters, in the hydrogenated product are, within the limits of experimental error, the same as those in the natural oil before hydrogenation.

It is also of interest to note that, insofar as has been observed, the process when carried out using unfractionated peppermint oil leads to litle or no racemization or alteration in the proportions of the isomers of menthone and menthol originally present in the oil used. This result is also surprising since it is known that both d-menthol and l-menthol are racemized without too great difficulty in an atmosphere of hydrogen and in the presence of certain catalysts to give dl-menthol having no optical rotation. In contrast to this, it is found that, following the procedure of the present invention, the hydrogenation of the menthofuran when carried out in the way described using unfractionated peppermint oil leads to a product which actually has a greater laevorotary power than does the unhydrogenated oil because of the removal of strongly dextro-rotary effect of the menthofuran. Thus, as is apparent from the appended examples, the hydrogenation of a peppermint oil containing 9 percent of menthofuran and having an optical rotation of −21° gave a product which contained no menthofuran and had an optical rotation of −26°.

According to the modification of the process of the invention wherein menthofuran-containing peppermint oil is first fractionated to prepare a menthofuran-rich fraction which also comprises menthone and wherein the menthofuran in the menthofuran-rich fraction is then hydrogenated, it has been pointed out that the fractionation to prepare the menthofuran-rich fraction can be carried out in any convenient way. Thus, in some instances it is convenient to cool menthofuran-containing peppermint oil to cause partial crystallization thereof and to then separate the crystals, consisting principally of menthol, from the uncrystallized menthofuran-rich liquid fraction of the original oil. Such a menthofuran-rich fraction, sometimes available in the trade as "dementholized peppermint oil," comprises essentially all of the menthofuran, menthone, menthol esters and hydrocarbons, as well as a considerable proportion of the menthol, present in the unfractionated peppermint oil. Hydrogenation of a menthofuran-rich fraction prepared in this manner leads to a product having essentially the same composition as the dementholized peppermint oil except for the conversion of the menthofuran in it to a hydrogenation product, presumably to tetrahydromenthofuran, and except, usually, for the conversion of certain unsaturated hydrocarbons which may be contained in it to hydrogenation products.

The hydrogenated product obtained by hydrogenating dementholized peppermint oil has not been described previously. The hydrogenated product can, if desired, be blended with the portion of the peppermint oil separated as crystals and a product obtained which is essentially identical with that obtained by hydrogenating the peppermint oil directly without first segregating the menthofuran in it into a menthofuran-rich fraction. Alternatively, the hydrogenation product may be used directly and without further treatment or blending, except for the removal of the catalyst and any catalyst support employed, e.g. by filtration, in place of conventional dementholized peppermint oil. In this instance the hydrogenated product has the same advantages over the dementholized but unhydrogenated peppermint oil which have been referred to previously in pointing out the advantages of the product obtained by hydrogenating whole peppermint oil without first separating it into fractions.

In still other instances it is more convenient to segregate the menthofuran contained in peppermint oil into a menthofuran-rich fraction by fractionally distilling the oil, as mentioned previously, preferably under reduced pressure, and collecting a suitable menthofuran-rich fraction of the distillate. When proceeding in this way it is often convenient to collect a fraction containing any unsaturated hydrocarbons present in the oil as a fraction separate from the menthofuran-rich fraction and thus to avoid hydrogenation of the unsaturated hydrocarbons, although it is by no means essential that this be done.

Following the hydrogenation of the menthofuran-rich fraction obtained by fractional distillation, the hydrogenated fraction can conveniently be mixed or blended with some or all of the unhydrogenated fractions of the original peppermint oil which was fractionated. When all of the unhydrogenated fractions are included in such a blend, a product is obtained which has essentially the same proportions of menthone, menthol and menthol esters as the peppermint oil which was fractionated. In the event the unsaturated hydrocarbons are collected along with the menthofuran in the menthofuran-rich fraction and are thus hydrogenated along with the menthofuran, the blending of the hydrogenated fraction with all of the other fractions yields a product essentially identical with that obtained by hydrogenating the unfractionated peppermint oil directly without segregating the menthofuran in a menthofuran-rich fraction. It is to be noted that the proportion of menthone in the product resulting from the hydrogenation of the menthofuran-rich fraction of the natural oil is essentially the same as the proportion therein prior to the hydrogenation, for the reasons explained previously in the discussion of the hydrogenation step as applied to the natural oil itself.

From the foregoing it is clear that it is entirely feasible to carry out the fractional distillation of any particular grade of peppermint oil in such a way that not only is a menthofuran-rich fraction of the oil obtained but also so that other fractions are obtained which, upon blending with the hydrogenated fraction, lead to products which have the most favorable characteristics resulting from fractional distillation of the natural oil in addition to other favorable characteristics mentioned previously as accruing to the hydrogenation of the menthofuran. Such blended products, which have not been described previously, differ principally in the components which they contain from previously known blended products in that they comprise one molar proportion of a hydrogenation product of menthofuran, presumably of tetrahydromenthofuran, for each molar proportion of menthofuran, and sometimes one molar proportion of hydrogenation product of unsaturated hydrocarbon for each molar proportion of unsaturated hydrocarbon, in the previously known blends. The advantages accruing to this difference in composition have been pointed out previously.

As previously noted, the hydrogenation of the peppermint oil product can be carried out conveniently by mixing the peppermint oil product with the catalyst material and then agitating the mixture in an atmosphere of gaseous hydrogen. Hydrogen is absorbed rapidly and the hydrogenation reaction is complete after from a few to several hours as evidenced by no further absorption of hydrogen. The hydrogenated mixture can then be worked up conveniently by filtering it to remove the catalyst and any catalyst support, such as asbestos or charcoal, upon which the catalyst may have been deposited. The filtrate is usually no more colored than the original peppermint oil product and, as a matter of fact, when charcoal is used as the catalyst support, may sometimes be even less colored than the peppermint oil product prior to mixing it with the catalyst material. The filtrate is generally ready for subsequent use as a flavoring material or for blending purposes without further treatment. The use of diluent liquids or solvents in admixture with the peppermint oil product is unnecessary although such substances can be employed in special instances, if desirable. In the event a solvent or diluent liquid is mixed with the peppermint oil product prior to the hydrogenation, it can, of course, be removed from the hydrogenated product by fractional distillation in the event this is desirable.

Small proportions of catalyst material, based upon the peppermint oil product being hydrogenated, can be employed. However, if too small a proportion of the catalyst material is employed, the rate of hydrogenation may be undesirably slow. In general, it has been found desirable, although not essential, to employ roughly 0.25 to 0.5 percent by weight of the catalytic platinum group metal based upon the amount of peppermint oil product being hydrogenated. Supported catalysts comprising from 2 to 10 percent by weight of the catalytic metal can be employed with satisfaction, although here again the proportion of metal with respect to the support is not critical. Inasmuch as essentially all of the catalyst material can be recovered by filtration in a form suitable for reuse or for reworking, the amount of catalytic metal actually consumed is limited to that which may be lost mechanically.

The hydrogenation can be carried out under widely differing conditions of temperature and pressure without significant alteration of the results obtained. Efficient agitation of the mixture of peppermint oil product and catalyst material in an atmosphere of hydrogen is advisable to facilitate rapid absorption of the hydrogen. The reaction is generally carried out in a closed vessel capable of withstanding moderate internal pressure and either provided with a suitable agitator or arranged so that the entire vessel and contents can be shaken vigorously. However, the invention is not limited as to apparatus. In general, it is advisable to maintain the pressure of hydrogen inside the reaction vessel somewhat greater than atmospheric pressure, both to prevent leakage of air into the vessel and to facilitate as rapid absorption of the hydrogen as possible. It has been found that adequate results are obtained employing hydrogen at a pressure between atmospheric pressure and about 100 p.s.i.g.; preferably at a pressure between about 25 and 100 p.s.i.g. although pressures a great deal higher than 100 p.s.i.g. can be employed, if desired. Insofar as is known, the maximum pressure of the gaseous hydrogen in the hydrogenation vessel in any particular instance is limited only by the suitability of the apparatus employed. The hydrogen pressure can be maintained constant in the hydrogenation vessel, e.g. by automatic means, or, if more convenient, the reaction vessel can be charged with hydrogen intermittently up to a suitable pressure. In any event the hydrogenation reaction can be considered complete when hydrogen is no longer absorbed.

The hydrogenation reaction proceeds rapidly at ordinary atmospheric temperature and is often carried out at this temperature because of the convenience afforded. However, temperatures somewhat higher, or somewhat lower, than ordinary atmospheric temperature may be employed, if desired, even though it has not been observed that the rate of hydrogen absorption is altered appreciably thereby. In general it is preferred to maintain the temperature of the mixture of peppermint oil product and catalyst material during the absorption of hydrogen by the mixture at a temperature below about 100° C. to avoid all possibility of hydrogenation of the menthone in the mixture. It is, however, preferable that the temperature of the mixture not be lower than the freezing temperature, or initial crystallizing temperature, of the mixture since the solidification of a part of the liquid is likely to interfere with the rapid completion of the hydrogenation reaction.

Generally speaking, under the conditions mentioned the hydrogenation reaction is complete within several hours, e.g. within from 1 or 2 to 10 or 15 hours. However, the particular metal employed as catalyst has some influence on the rate of hydrogen absorption, it having been observed, for example, that in some instances the use of finely divided palladium dispersed on charcoal leads to more rapid absorption of hydrogen than does the use of finely divided platinum dispersed on charcoal. However, as pointed out previously and as is illustrated by the appended examples, it is convenient and suitable to employ any of the platinum metals referred to previously as the catalyst when prepared in suitable finely divided catalytic form.

Certain advantages of the invention are apparent from the following examples which are given by way of illustration only and are not to be construed as limiting.

*Example 1*

Using peppermint oil obtained by distillation with steam of the oil contained in freshly harvested *Mentha piperita* plants grown in the western part of the United States and containing about 9 percent of menthofuran, pure menthofuran was prepared by treatment of the peppermint oil with maleic anhydride to form the crystalline addition product of the anhydride and menthofuran and subsequently separating the addition product and regenerating the menthofuran in known manner. The menthofuran thus obtained had an optical rotation of +95°, a specific gravity of 0.9672 (25°/25°), a refractive index of 1.4868 at 20° C., and boiled completely between 47° and 49° under a pressure of 0.4 millimeter of mercury.

Another portion of peppermint oil was fractionally distilled and a fraction was collected which contained a high proportion of menthone. The menthone-rich fraction thus prepared had a specific gravity of 0.8991 (25°/25°) and a refractive index of 1.4567 at 20° C. It was in the form of a colorless liquid boiling completely between 58° and 66° C. under a pressure of approximately 0.4 millimeter of mercury and having an optical rotation of +3°. It contained 65.6% menthone, 26.0% menthol, 2.3% menthol esters and 2.5% menthofuran.

The menthofuran and the menthone-rich fractions prepared in the foregoing manner were used in certain of the ensuing examples.

*Example 2*

A supported palladium catalyst was prepared by dissolving palladium chloride in water and absorbing the solution on powdered charcoal. The mixture was then dried and kept in a stream of hydrogen at a temperature of about 550° C. until chlorine was no longer present in the exhaust hydrogen. The palladium chloride and charcoal were used in amounts calculated to give a catalyst material containing 5% by weight of palladium. The product was an efficient hydrogenation catalyst.

A catalyst material consisting of 5% by weight of platinum supported in finely divided form on carbon was prepared in a manner entirely analogous to that just described for the preparation of the palladium catalyst.

*Example 3*

One hundred grams of pure menthofuran was placed in a hydrogenation apparatus along with 10 grams of finely divided catalyst material consisting of palladium supported on carbon, prepared as described in Example 2. The catalyst material contained 5% by weight of palladium. The hydrogenation apparatus was closed, evacuated, and purged with hydrogen to free it from air and then shaken at ordinary room temperature (23° C.) while admitting hydrogen until the pressure in the apparatus was 60 p.s.i.g. Hydrogen was absorbed readily, the pressure dropping to 8 p.s.i.g., at which point the apparatus was repressured to 60 p.s.i.g. The hydrogenation was continued in this manner until the pressure remained steady at 60 p.s.i.g. for several hours. The amount of hydrogen absorbed was calculated on the basis of the vapor space existing in the apparatus employed and the total drop in pressure in the apparatus due to the absorption of hydrogen. The amount of hydrogen absorbed when calculated in this way was found to be almost exactly two moles for each mole of menthofuran employed.

When hydrogen was no longer absorbed, the pressure in the apparatus was relieved and the contents of the vessel removed and filtered to separate the palladium catalyst material. The filtrate was a clear colorless liquid which distilled uniformly between 32° and 37° C. under a vacuum of 0.4 millimeter of mercury. The filtered product had an optical rotation of +4.6°, a refractive index of 1.4628 at 20° C. and a specific gravity of 0.9286 at 25°/25°. The yield of product calculated as tetrahydromenthofuran was essentially quantitative. No evidence of the breaking of the furan ring during the hydrogenation was noted.

The hydrogenation of menthofuran following the foregoing procedure was carried out using, in one instance, platinum and, in another instance, ruthenium distributed on charcoal. Comparable results were obtained except that in the case of ruthenium the rate of hydrogen absorption was substantially less than with palladium.

*Example 4*

Fifty grams of a peppermint oil fraction containing 84.4% menthone and free of menthofuran were shaken at ordinary room temperature and under an atmosphere of hydrogen at a pressure of 58 p.s.i.g. for eight hours with 5 grams of catalyst material consisting of 5% palladium on carbon. No drop in pressure of the hydrogen atmosphere occurred and an assay showed that the menthone content of the oil was unchanged.

*Example 5*

Fifty grams of peppermint oil having an optical rotation of −21° and containing 9% menthofuran was hydrogenated at ordinary room temperature under an atmosphere of hydrogen at a pressure not exceeding 60 p.s.i.g. using 7 grams of a catalyst material consisting of charcoal containing 5% palladium. Additional hydrogen was admitted to the reaction vessel from time to time to restore the pressure to about 60 p.s.i.g. The process was discontinued when hydrogen was no longer absorbed as indicated by no further decrease in pressure upon continued shaking. The period of time during which hydrogen was absorbed was approximately ten hours. The hydrogenation product was then removed from the reaction vessel and filtered to remove the charcoal and palladium. The filtrate was a clear, colorless liquid which had an optical rotation of −26° and contained no menthofuran. Within the limits of error, the proportions of menthol, menthone and menthol esters in the hydrogenated oil assayed the same as the corresponding values for the unhydrogenated oil. The hydrogenated product was in all respects judged to be of better quality than the original unhydrogenated peppermint oil.

Substantially identical results are obtained using catalyst materials containing finely divided catalytic platinum, ruthenium or rhodium, in place of palladium.

*Example 6*

A quantity of peppermint oil containing 9% of menthofuran having an optical rotation of −20.7° was fractionally distilled under vacuum and the distillate collected in ten approximately equal portions. The second and third fractions which had been collected were mixed together to give a product having an optical rotation of +18.5° and containing approximately 40% by weight of menthofuran mixed with menthone.

Ninety-eight grams of the mixed second and third fractions containing approximately 40% by weight of menthofuran were shaken at 20° to 25° C. under an atmosphere of hydrogen at a pressure of 60 p.s.i.g. with 10 grams of a catalyst material consisting of charcoal containing 5% of finely divided palladium until hydrogen was no longer absorbed. The product was then filtered to remove the catalyst material. The filtrate was a clear colorless liquid having an optical rotation of −7°. The calculated amount of hydrogen absorbed corresponded almost exactly to two moles of hydrogen for each mole of menthofuran in the portion of mixed fractions which was hydrogenated.

The hydrogenated product was mixed with the remaining eight fractions obtained by fractional distillation of the original peppermint oil. The mixture which resulted was free of menthofuran, had an optical rotation of −26° and was in all respects judged to be of equal, or better, quality than the original peppermint oil. The assay indicated no change in the menthol, menthone or menthol ester content of the oil.

*Example 7*

Results entirely similar to those obtained in the foregoing examples are obtained using platinum group metal catalysts supported on asbestos, e.g. platinized asbestos, palladium on asbestos and ruthenium on asbestos, in place of palladium on charcoal. Similar results are also obtained using unsupported platinum group metal catalysts, such as platinum black, palladium black, ruthenium black, spongy ruthenium, spongy palladium, and spongy platinum.

*Example 8*

The relative susceptibilities of peppermint oil containing menthofuran and of the new menthofuran-free product to the development of color and a bitter after-flavor when exposed to the air were determined in the following way. In carrying out the test freshly distilled peppermint oil grown in the western part of the United States containing about 9% by weight of menthofuran was employed.

One portion of the peppermint oil, designated as sample No. 1, and containing about 9% of menthofuran was exposed to the air in an open flask.

Another portion of the peppermint oil was fractionally distilled and a fraction was collected which contained essentially all of the menthofuran. The collected fraction was hydrogenated and then blended with the unhydrogenated menthofuran-free fractions of the peppermint oil, these procedures being carried out essentially as described in Example 6. The blended menthofuran-free new product obtained in this manner, designated as sample No. 2, was exposed to the air in an open flask.

Another portion of the menthofuran-containing peppermint oil was hydrogenated by essentially the procedure of Example 5. The menthofuran-free product obtained in this manner, designated as sample No. 3, was exposed to the air in an open flask.

At the beginning of the exposure period, each of the three samples was a clear, colorless liquid free of any solid material. No bitter after-flavor could be detected with any one of the three samples when tested for flavoring characteristics.

The three samples were allowed to stand undisturbed for a period of several weeks and then examined. At the end of the test period it was found that sample No. 1 had turned greenish in color and that the walls of the flask above the liquid were covered with a deposit of fine, needlelike white crystals. The residual liquid when tested for flavoring characteristics was found to have acquired a distinctive bitter after-flavor characteristic of menthofuran-containing peppermint oils after prolonged exposure to the air.

In contrast, neither sample No. 2 nor sample No. 3 had developed any color whatsoever in the liquid and in neither instance was any crystalline deposit noted on the walls of the vessels above the liquid. Careful determination of the flavoring characteristics of these two samples failed to reveal any bitter after-flavor characteristic of the exposed sample No. 1. Insofar as could be observed, the two samples of oil which were free of menthofuran had suffered no deterioration of any sort by the prolonged exposure to the air.

*Example 9*

A menthone-rich fraction of menthofuran-containing peppermint oil was prepared by fractional distillation of the oil, as referred to in Example 1. The fraction contained 65.6% menthone, 26.0% menthol, 2.3% menthol esters and 2.5% menthofuran.

The menthone-rich fraction referred to in the previous paragraph was hydrogenated essentially as by the method of Example 5. Two moles of hydrogen was absorbed for each mole of menthofuran in the menthone-rich fraction.

I claim:

1. In a method for treating a peppermint oil product comprising menthofuran and menthone to reduce the proportion of menthofuran therein, the steps which include: mixing a liquid peppermint oil product comprising menthofuran and menthone with a hydrogenation catalyst material comprising a metal selected from the group of metals consisting of ruthenium, rhodium, palladium, osmium, iridium and platinum; agitating the mixture in an atmosphere of gaseous hydrogen until the absorption of hydrogen substantially ceases; and subsequently filtering the mixture to separate the insoluble catalyst material and recover a hydrogenated product essentially free of unhydrogenated menthofuran but comprising essentially the same proportion of menthone on a molar basis as the unhydrogenated liquid peppermint oil product used.

2. The method as claimed in claim 1 wherein the catalyst material comprises platinum.

3. The method as claimed in claim 1 wherein the catalyst material comprises palladium.

4. The method as claimed in claim 1 wherein the catalyst material comprises ruthenium.

5. The method as claimed in claim 1 wherein the catalyst material is a supported catalyst.

6. The method as claimed in claim 1 wherein the mixture of liquid peppermint oil product and catalyst material is agitated in an atmosphere of gaseous hydrogen at a temperature between the crystallizing temperature of the liquid peppermint oil product and about 100° C.

7. The method as claimed in claim 1 wherein the mixture of liquid peppermint oil product and catalyst material is agitated in an atmosphere of gaseous hydrogen at a pressure greater than atmospheric pressure.

8. The method as claimed in claim 1 wherein the peppermint oil product is peppermint oil essentially as obtained by the distillation with steam of the oil from peppermint plants.

9. The method as claimed in claim 1 wherein the peppermint oil product is a fraction of natural peppermint oil in which the proportion of menthofuran is greater than in the unfractionated peppermint oil.

10. In a method for treating peppermint oil comprising menthofuran and menthone to reduce the proportion of menthofuran therein, the steps which include: mixing liquid peppermint oil comprising menthofuran and menthone with a hydrogenation catalyst material comprising a metal selected from the group of metals consisting of ruthenium, rhodium, palladium, osmium, iridium and platinum; agitating the mixture in an atmosphere of gaseous hydrogen under super-atmospheric pressure and at a temperature between the crystallizing temperature of the peppermint oil and about 100° C. until the absorption of hydrogen substantially ceases; and subsequently filtering the hydrogenated mixture to separate insoluble material and recover a hydrogenated product essentially free of unhydrogenated menthofuran but comprising essentially the same proportion of menthone on a molar basis as the unhydrogenated peppermint oil used.

11. In a method for treating peppermint oil comprising menthofuran and menthone, the steps which include: fractionally distilling peppermint oil comprising menthofuran and menthone; collecting a fraction of the distillate comprising menthone and a proportion of menthofuran greater than the proportion thereof in the unfractionated peppermint oil; mixing the collected fraction with a hydrogenation catalyst material comprising a metal selected from the group of metals consisting of ruthenium, rhodium, palladium, osmium, iridium and platinum; agitating the mixture in an atmosphere of gaseous hydrogen under super-atmospheric pressure and at a temperature between the crystallizing point of the collected fraction and about 100° C. until the absorption of hydrogen substantially ceases; filtering the hydrogenated mixture to separate insoluble material and recover a hydrogenated product essentially free of unhydrogenated menthofuran but comprising essentially the same proportion of menthone on a molar basis as the unhydrogenated collected fraction; and mixing the hydrogenated product with the unhydrogenated fractions from the fractional distillation.

12. A composition of matter prepared from a menthofuran- and menthone-containing peppermint oil product comprising essentially the same substances in the same proportions as in the peppermint oil product except for the replacement therein of the menthofuran with an essentially equivalent molar proportion of a hydrogenation product of menthofuran.

13. A hydrogenated product of a menthofuran- and menthone-containing peppermint oil product which is essentially free of menthofuran and which comprises a molar proportion of a hydrogenation product of menthofuran essentially equal to the molar proportion of menthofuran in the peppermint oil product hydrogenated and, in addition, essentially the same ingredients, other than menthofuran, in essentially the same proportions as in the peppermint oil product prior to its hydrogenation.

14. A hydrogenated product as claimed in claim 13 wherein the peppermint oil product hydrogenated is a fraction of natural peppermint oil comprising a proportion of menthofuran.

15. A hydrogenated product as claimed in claim 13 wherein the peppermint oil product hydrogenated is a natural peppermint oil.

16. An essentially menthofuran-free composition of matter having essentially the same composition as a preselected menthofuran-containing peppermint oil product except for the presence therein of a hydrogenation product of menthofuran in an amount substantially equal on a molar basis to the menthofuran in the preselected peppermint oil product, the composition being further characterized by its freedom, upon prolonged exposure to air, from the development of color and a bitter aftertaste when used for flavoring characteristic of the preselected peppermint oil product.

References Cited in the file of this patent

"Hydrogenation of Oils," by Ellis, second ed., D. Van Nostrand Co., 25 Park Place, New York, 1919, pages 39 and 250.

"The Structure and Composition of Foods," by Winton et al., vol IV, John Wiley & Sons, Inc., New York, 1939, page 233.